US012329709B1

(12) United States Patent
Wang et al.

(10) Patent No.: US 12,329,709 B1
(45) Date of Patent: Jun. 17, 2025

(54) MALE SEXUAL STIMULATION DEVICE

(71) Applicants: Qinling Wang, Guangdong (CN); Junpeng Wu, Shenzhen (CN)

(72) Inventors: Qinling Wang, Guangdong (CN); Junpeng Wu, Shenzhen (CN)

(73) Assignees: Qinling Wang, Heyuan (CN); Junpeng Wu, Shenzhen (CN)

(*) Notice: Subject to any disclaimer, the term of this patent is extended or adjusted under 35 U.S.C. 154(b) by 0 days.

(21) Appl. No.: 18/757,577

(22) Filed: Jun. 28, 2024

(30) Foreign Application Priority Data

Jun. 20, 2024 (CN) ......................... 202421423057.8

(51) Int. Cl.
*A61H 19/00* (2006.01)

(52) U.S. Cl.
CPC ..... *A61H 19/32* (2013.01); *A61H 2201/1215* (2013.01); *A61H 2201/1664* (2013.01); *A61H 2201/1671* (2013.01)

(58) Field of Classification Search
CPC .................... A61H 19/32; A61H 19/30; A61H 2201/1215; A61H 2201/1664; A61H 2201/1671; A61H 19/00; A61H 19/50; A61H 23/0254; A61H 23/0263; A61H 2201/1481; A61H 2201/149; A61H 2205/087; A61H 19/40
See application file for complete search history.

(56) References Cited

U.S. PATENT DOCUMENTS 11,554,073 B1 * 1/2023 Guo ....................... A61H 7/005
11,806,306 B1 * 11/2023 Guo ....................... A61H 7/007
12,011,409 B1 * 6/2024 Wang ..................... A61H 19/40
2009/0118652 A1 * 5/2009 Carlucci ................ A61H 7/007
601/134
2010/0268021 A1 * 10/2010 Standfest ........... A61H 15/0078
600/38

(Continued)

FOREIGN PATENT DOCUMENTS

WO WO-2005099366 A2 * 10/2005 ............... A61F 5/41
WO WO-2018176210 A1 * 10/2018
WO WO-2020193444 A1 * 10/2020 ......... A61H 15/0085

OTHER PUBLICATIONS

Machine translation of the written description and claims of WO2018176210A1 via espacenet (Year: 2018).*

*Primary Examiner* — Timothy A Stanis
*Assistant Examiner* — Tyler A Raubenstraw

(57) ABSTRACT

A male sexual stimulation device includes a first stimulation member, a second stimulation member and a driving assembly. The first stimulation member includes a first stimulation portion and a second stimulation portion which are opposite to each other, wherein a first chamber is defined between the first and second stimulation portions. The second stimulation member defines a second chamber therein, and the first and second chambers communicate with each other and cooperatively form an accommodating chamber for receiving a male genitalia therein. The driving assembly includes a first swinging arm and a driving source configured for driving the first swinging arm to swing. One end of the first swinging arm extends into the first stimulation portion, making the first stimulation portion be swingable relative the second stimulation portion to stimulate the male genitalia received in the accommodating space.

20 Claims, 12 Drawing Sheets

(56) References Cited

U.S. PATENT DOCUMENTS

| | | | | |
|---|---|---|---|---|
| 2013/0123674 | A1* | 5/2013 | Carter | A61H 23/0245 601/46 |
| 2014/0046127 | A1* | 2/2014 | Topolovac | A61H 23/04 600/38 |
| 2016/0199043 | A1* | 7/2016 | Koretsky | A61B 10/0058 604/349 |
| 2018/0092798 | A1* | 4/2018 | Shao | A61H 19/32 |
| 2019/0307636 | A1* | 10/2019 | Sloan | A61H 23/0263 |
| 2020/0046599 | A1* | 2/2020 | Sedic | A61F 5/41 |
| 2021/0059896 | A1* | 3/2021 | Truckai | A61H 23/0236 |
| 2021/0186798 | A1* | 6/2021 | Tang | A61H 19/32 |
| 2021/0401409 | A1* | 12/2021 | Nakamura | A61B 10/0058 |
| 2022/0331196 | A1* | 10/2022 | Sloan | H04N 21/251 |
| 2023/0083660 | A1* | 3/2023 | Raju | A61H 19/32 600/38 |
| 2023/0116215 | A1* | 4/2023 | Liu | A61H 9/0057 600/38 |
| 2023/0210718 | A1* | 7/2023 | Zhou | A61H 19/32 600/38 |
| 2023/0277408 | A1* | 9/2023 | Luo | A61H 15/0078 601/84 |
| 2023/0293385 | A1* | 9/2023 | Stewart | A61H 19/32 600/38 |
| 2024/0415498 | A1* | 12/2024 | Chen | A61H 19/32 |

* cited by examiner

MALE SEXUAL STIMULATION DEVICE

CROSS-REFERENCE TO RELATED APPLICATIONS

This application claims the priority of Chinese patent application No. 202421423057.8, filed on Jun. 20, 2024, the entire contents of which are hereby incorporated by reference.

TECHNICAL FIELD

The present application relates to the technical field of sex toys, in particular to a male sexual stimulation device.

BACKGROUND

Male sexual stimulation device, such as masturbation cup, is a tool for simulating the female vaginal to allow males, particularly the bachelordom and long-distance separation males, to release their sex pressure, which satisfy their physiological and psychological needs to a certain extent.

Generally, the existing masturbation cup includes a cup holder and a cup body connected to the cup holder, wherein the cup body is hollow. Functional members, such as vibration motors, are set in and/or around the cup body. During the sexual intercourse, male genitalia is inserted into the hollow cup body, and the vibration motors drive the cup body to vibrate in high frequency, thereby stimulating the male genitalia inside the cup body. However, a stimulation effect of such device is not good.

SUMMARY

In view of this, an object of the present application is to provide a male sexual stimulation device with enhanced stimulation effect.

To achieve the above object, this application provides a male sexual stimulation device including:

- a first stimulation member including a first stimulation portion and a second stimulation portion which are opposite to each other, a first chamber being defined between the first and second stimulation portions;
- a second stimulation member defining a second chamber therein, the first and second chambers communicating with each other and cooperatively forming an accommodating chamber for receiving a male genitalia therein; and
- a driving assembly comprising a first swinging arm and a driving source configured for driving the first swinging arm to swing, one end of the first swinging arm extending into the first stimulation portion, making the first stimulation portion be swingable relative the second stimulation portion to stimulate the male genitalia received in the accommodating space.

Compared with the prior art, the present application has two stimulation members configured to stimulate the male genitalia received in the accommodating space in different manners, wherein the first stimulation member clamps and kneads the male genitalia, while the second stimulation member may rotate, vibrate or move telescopically, thus a stimulation effect of the present application is better, and the users are more likely to reach orgasm with the help of the present application.

DESCRIPTION OF THE EMBODIMENTS

For better understanding the present application, a more detailed description of the present application will be given below with reference to the append drawings. The append drawings exemplify one or more embodiments of the present application to make the understanding of the disclosed technical solutions more accurate and thorough. However, it should be understood that the present application can be implemented in various forms, not limited to the embodiments described below.

The same or similar labels in the append drawings of the present application correspond to the same or similar components. In the description of the present application, it should be understood that terms such as “up”, “down”, “left”, “right” indicating an oriental or positional relationship based on the oriental or positional relationship shown in the append drawings, which is only intended to facilitate the description of the present application and simplify the description, not to indicate or imply that the apparatus or component referred must have a specific orientation, is constructed and operated in a specific orientation. Therefore, the terms describing the position relationship in the append drawings are only for illustrative purposes, and cannot be understood as a limitation to the present application. For those ordinary skilled in the art, the specific meanings of the above terms may be understood according to specific circumstances.

In addition, descriptions related to “first”, “second” and the like in the embodiments of the present application are only used for descriptive purposes and cannot be understood as indicating or implying their relative importance or implicitly indicating the number of technical features indicated. Therefore, a feature limited to “first” and “second” may explicitly or implicitly includes at least one of this feature. In addition, “and/or” in the whole specification means that includes three parallel schemes. Taking “A and/or B” as an example, it includes scheme A, scheme B, or scheme that including both A and B.

In addition, technical solutions of various embodiments may be combined with each other, but must be based on what those ordinary skilled in the art can achieve. When the combination of technical solutions conflicts or cannot be achieved, it should be considered that the combination of such technical solutions does not exist and is not within the scope of the present application.

Referring to FIGS. 1-5, a male sexual stimulation device according to an embodiment of the present application is shown. In this embodiment, the male sexual stimulation device 100 includes a first stimulation member 20, a second stimulation member 30, and a driving assembly.

Figure 1:
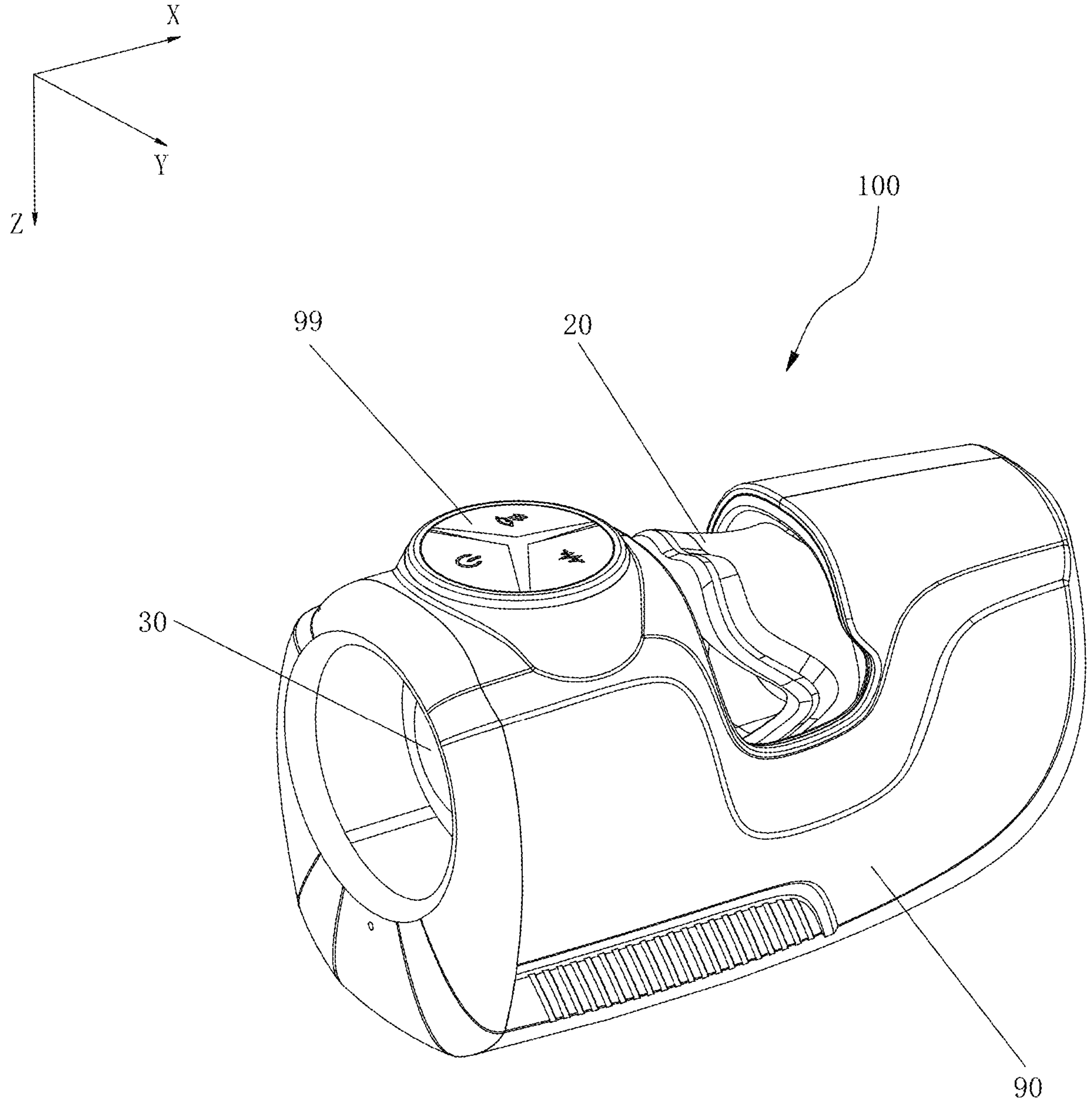
FIG. 1 is a schematic view of a male sexual stimulation device according to an embodiment of the present application.
Figure 2:
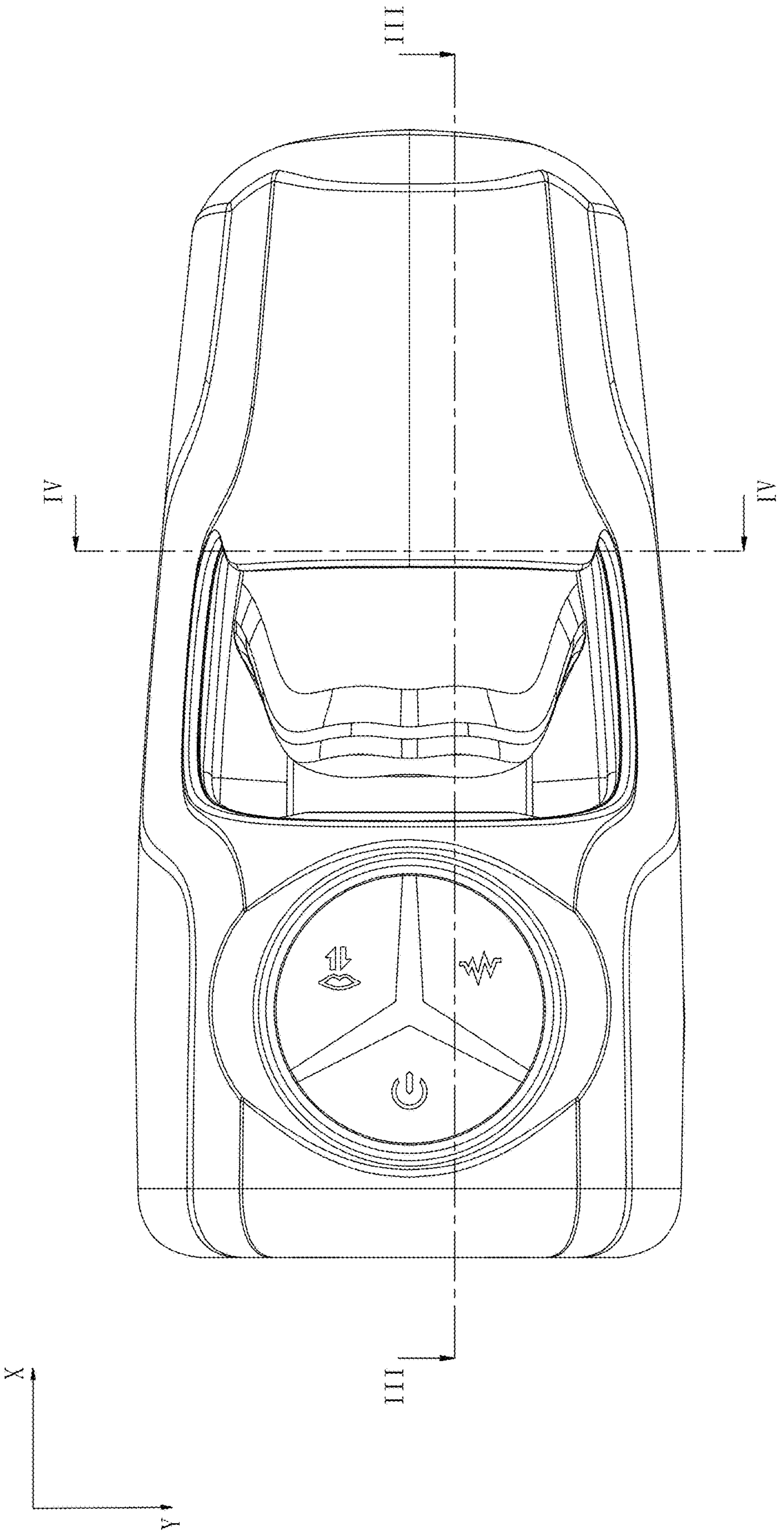
FIG. 2 is a top view of the male sexual stimulation device of FIG. 1.
Figure 3:
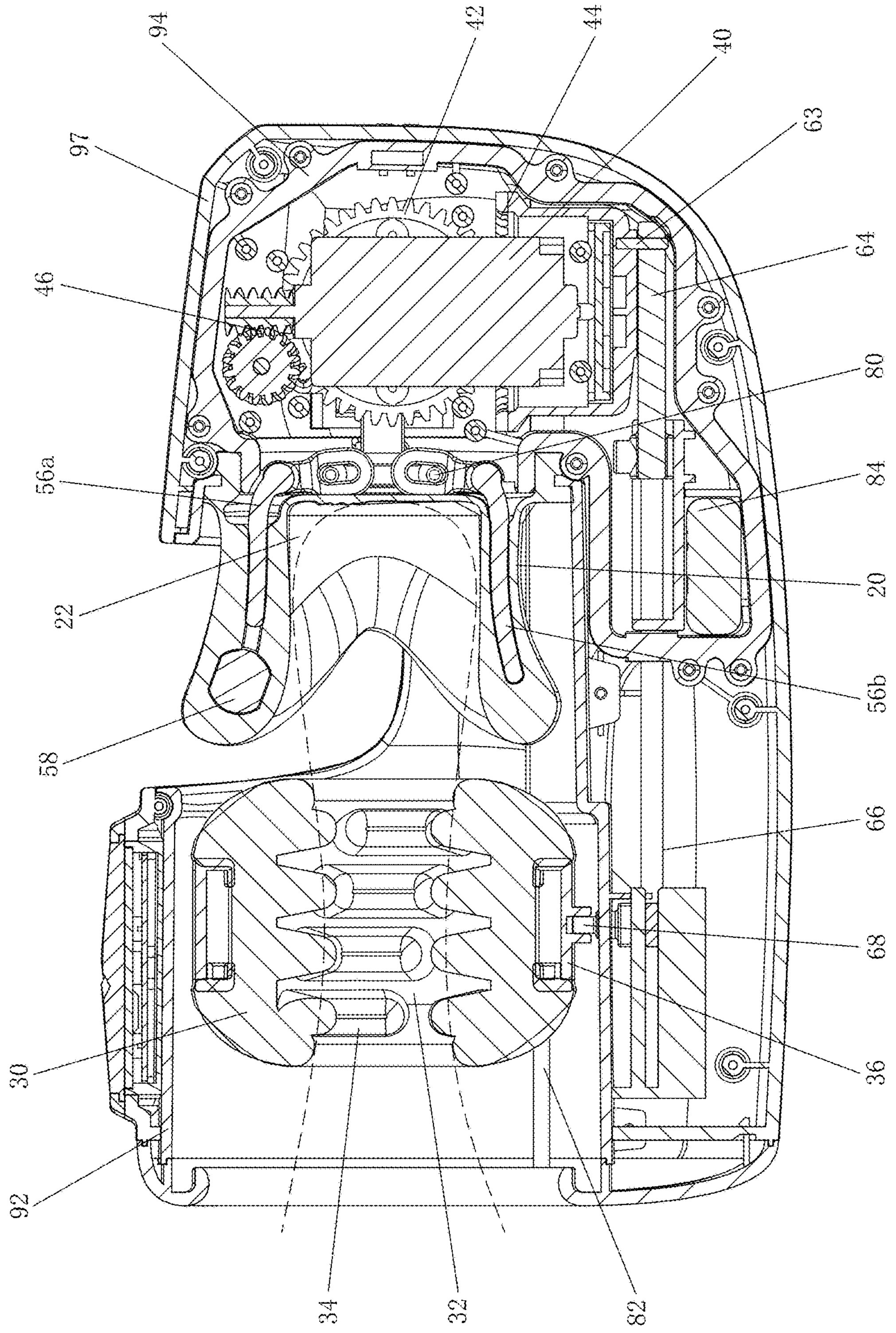
FIG. 3 is a cross sectional view of the male sexual stimulation device taken along line III-III of FIG. 2.
Figure 5:
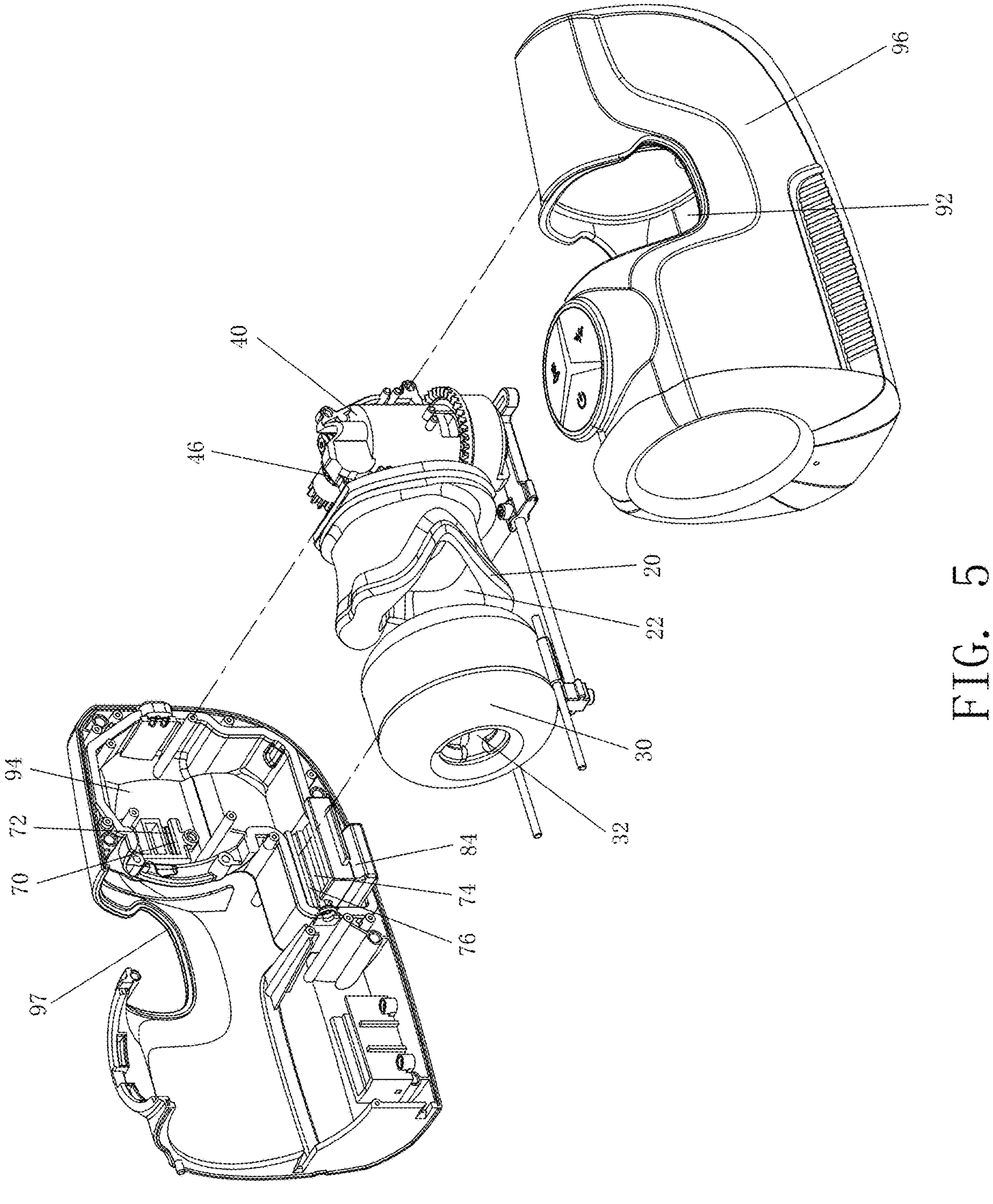
FIG. 5 is an exploded view of the male sexual stimulation device of FIG. 1.

As shown in FIG. 3 and FIG. 5, the first stimulation member 20 defines a first chamber 22 therein, and the second stimulation member 30 defines a second chamber 32 therein. The first chamber 22 and the second chamber 32 are arranged in sequence along an axial direction of the male sexual stimulation device 100, communicating with each other and cooperatively forming an accommodating chamber. The accommodating chamber is elongated and generally column-shaped, and configured with a shape and a size being suitable for accommodating a male genitalia therein.

During use, as shown in FIG. 3, the male genitalia is inserted into the accommodating chamber of the device 100. Under the action of the driving assembly, the first stimulation member 20 generates a first motion, such as clamping and kneading; and, the second stimulation member 30 generates a different second motion, such as linear movement, rotation, vibration, and etc. The first and second stimulation members 20, 30 simultaneously stimulate the male genitalia in different manners, thus the user is more likely to reach orgasm with the help of the present device 100.

The first and second stimulation members 20, 30 are both made of soft materials, such as silicone, which have a soft touch and a certain elastic buffering effect, making the users feel more comfortable. In this embodiment, the second stimulation member 30 is hollow and cylindrical-shaped, and the second chamber 32 extends through two axial ends of the second stimulation member 30. When the device 100 is in use, the male genitalia is inserted into the second chamber 32 through an end of the second stimulation member 30 away from the first stimulation member 20. A front end of the male genitalia, i.e. the glans, passes through the second chamber 32 and extends into the first chamber 22 of the first stimulation member 20. Preferably, an end of the first stimulation member 20 away from the second stimulation member 30 is closed, enclosing the glans of the male genitalia that extends into the first chamber 22.

As shown in FIG. 3, in this embodiment, the first and second stimulation members 20, 30 are separated from each other in the axial direction, with a gap defined therebetween, so that the first and second stimulation members 20, 30 do not interfere with each other during movement. In some embodiments, elastic structures such as elastic sheets, elastic strips, etc. may be provided between the first and second stimulation members 20, 30, as long as they do not affect their movement, especially not affect telescopic movement of the second stimulation member 30. Preferably, the elastic structure is integrally formed with the first and second stimulation members 20, 30 through injection molding.

Figure 9:
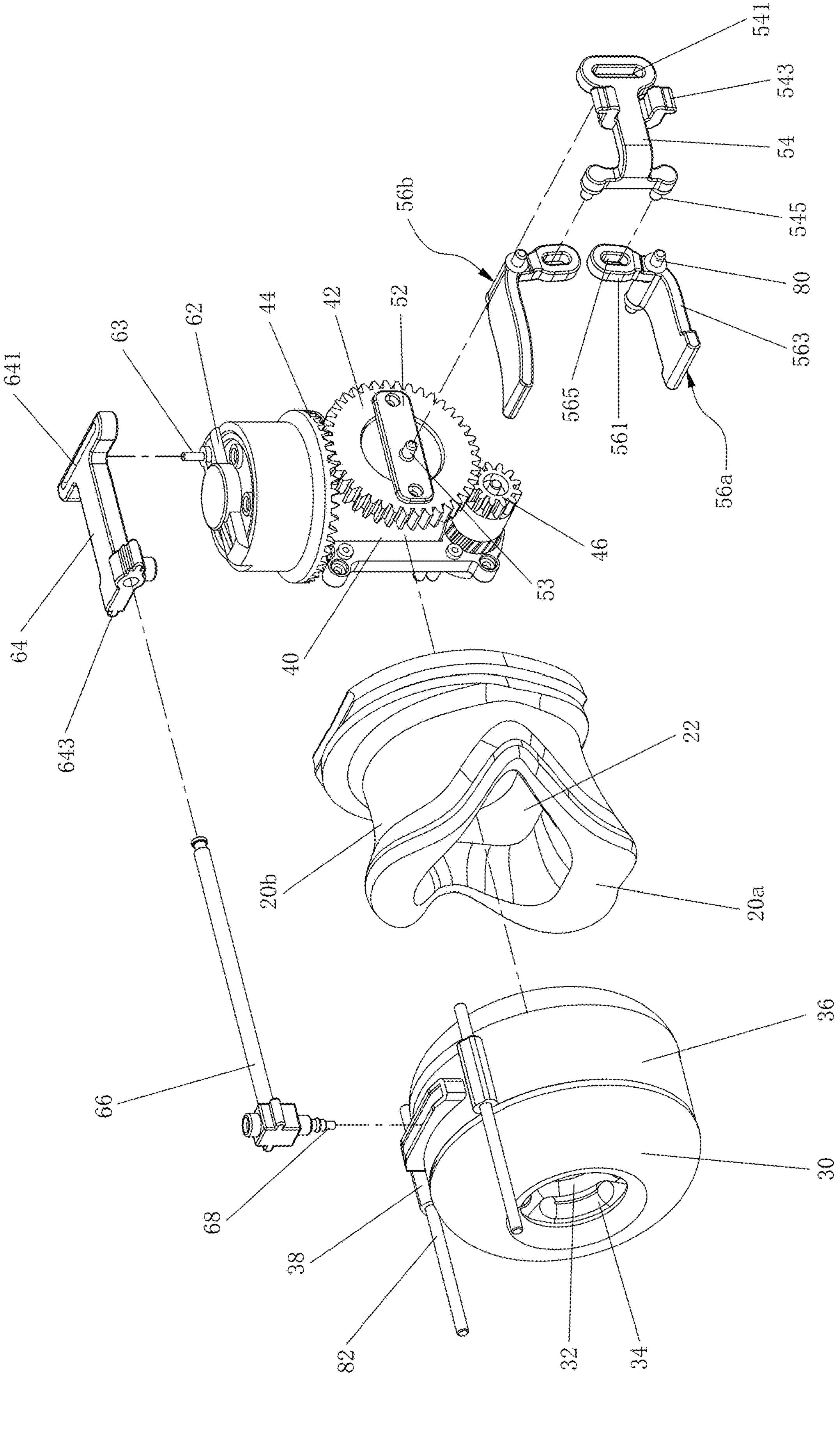
FIG. 9 is a further exploded view of FIG. 6.
Figure 10:
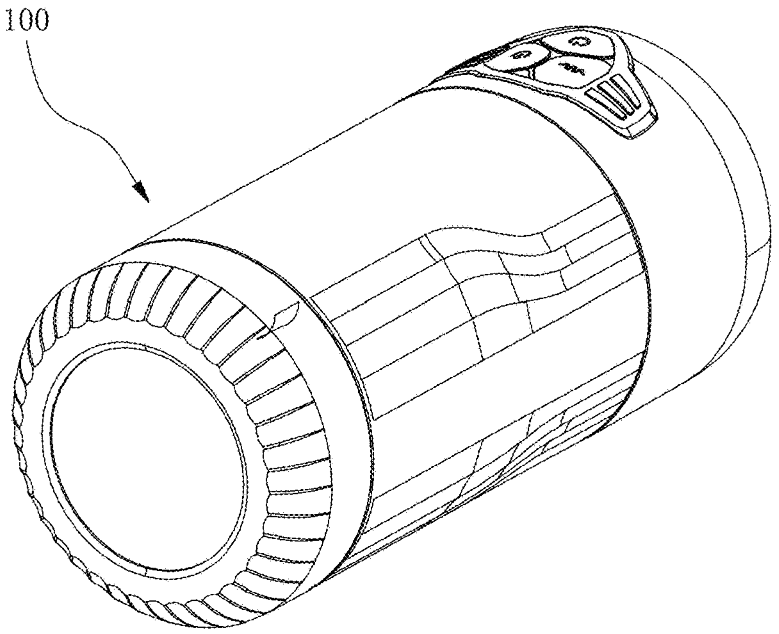
FIG. 10 is a schematic view of a male sexual stimulation device according to another embodiment of the present application.
Figure 11:
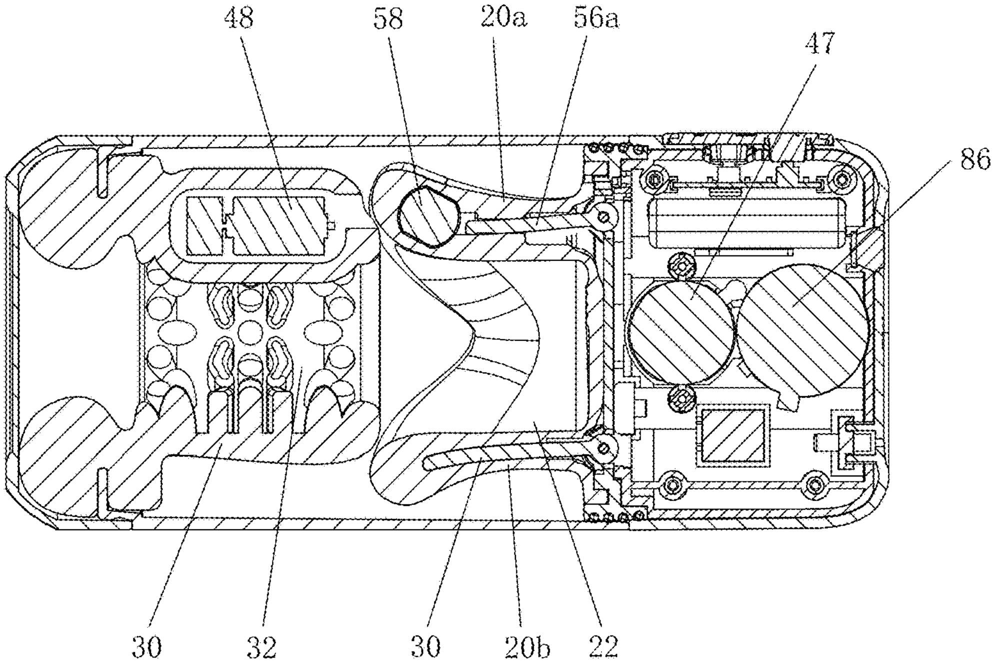
FIG. 11 is a cross sectional view of the male sexual stimulation device of FIG. 10.
Figure 12:
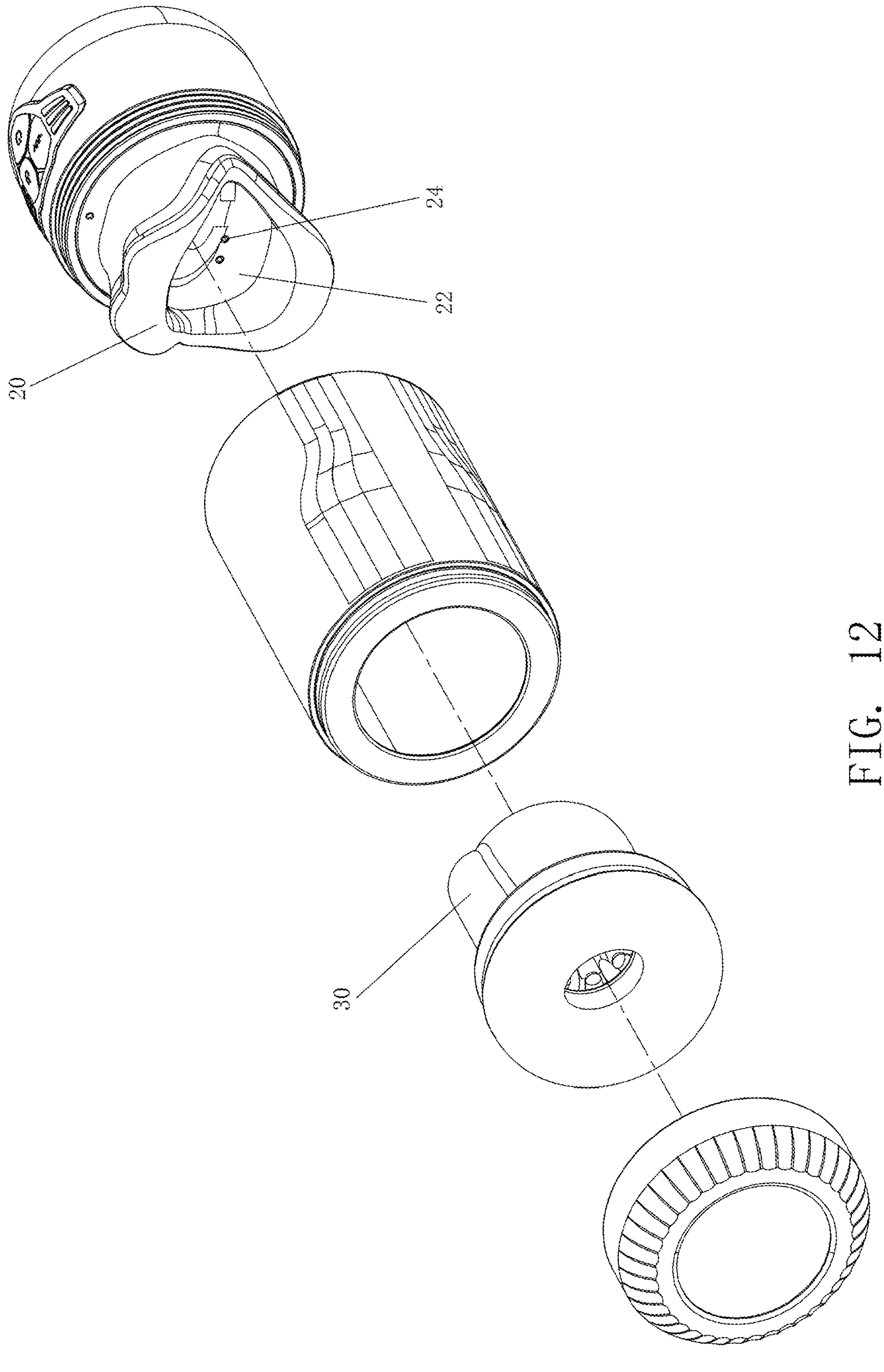
FIG. 12 is an exploded view of the male sexual stimulation device of FIG. 10.

As shown in FIG. 9, in this embodiment, the first stimulation member 20 is generally mouth-like, and includes a first stimulation portion 20*a* and a second stimulation portion 20*b* which are opposite to each other, and the first chamber 22 is defined between the first stimulation portion 20*a* and the second stimulation portion 20*b*. Under the action of the driving assembly, the first stimulation portion 20*a* and the second stimulation portion 20*b* swing towards or away from each other, clamping and kneading the glans of the male genitalia accommodated in the first chamber 22. In the illustrated embodiment, the first stimulation portion 20*a* and the second stimulation portion 20*b* may be connected with each other in a circumferential direction, so that the first stimulation member 20 in whole is annular and can more tightly enclose the glans of the male genitalia.

Preferably, the first stimulation member 20 is concave at a connection point of the first stimulation portion 20*a* and the second stimulation portion 20*b*, so that the swinging of the first stimulation portion 20*a* and second stimulation portion 20*b* will not affect each other. In some embodiments, the first stimulation portion 20*a* and the second stimulation portion 20*b* may be separated in the circumferential direction, which is not limited to specific embodiments.

As shown in FIGS. 6-9, the driving assembly includes a driving source and swinging arms. In this embodiment, the swinging arms includes a first swinging arm 56*a* engaged with the first stimulation portion 20*a*, and a second swinging arm 56*b* engaged with the second stimulation portion 20*b*.

The driving source preferably is a gear motor, and includes a driving motor 40 and first and second output wheels 42, 44 driven by the motor 40 to rotate with a speed about of 1000 rpm. The first output wheel 42 is connected to the first and second swinging arms 56*a* through a first transmission unit 50, so as to drive the first stimulation portion 20*a* and the second stimulation portion 20*b* of the first stimulation member 20 to swing relative to each other. The second output wheel 44 is connected to the second stimulation member 30 through a second transmission unit 60, so as to drive the second stimulation member 30 to do reciprocating movement in the axial direction.

Figure 6:
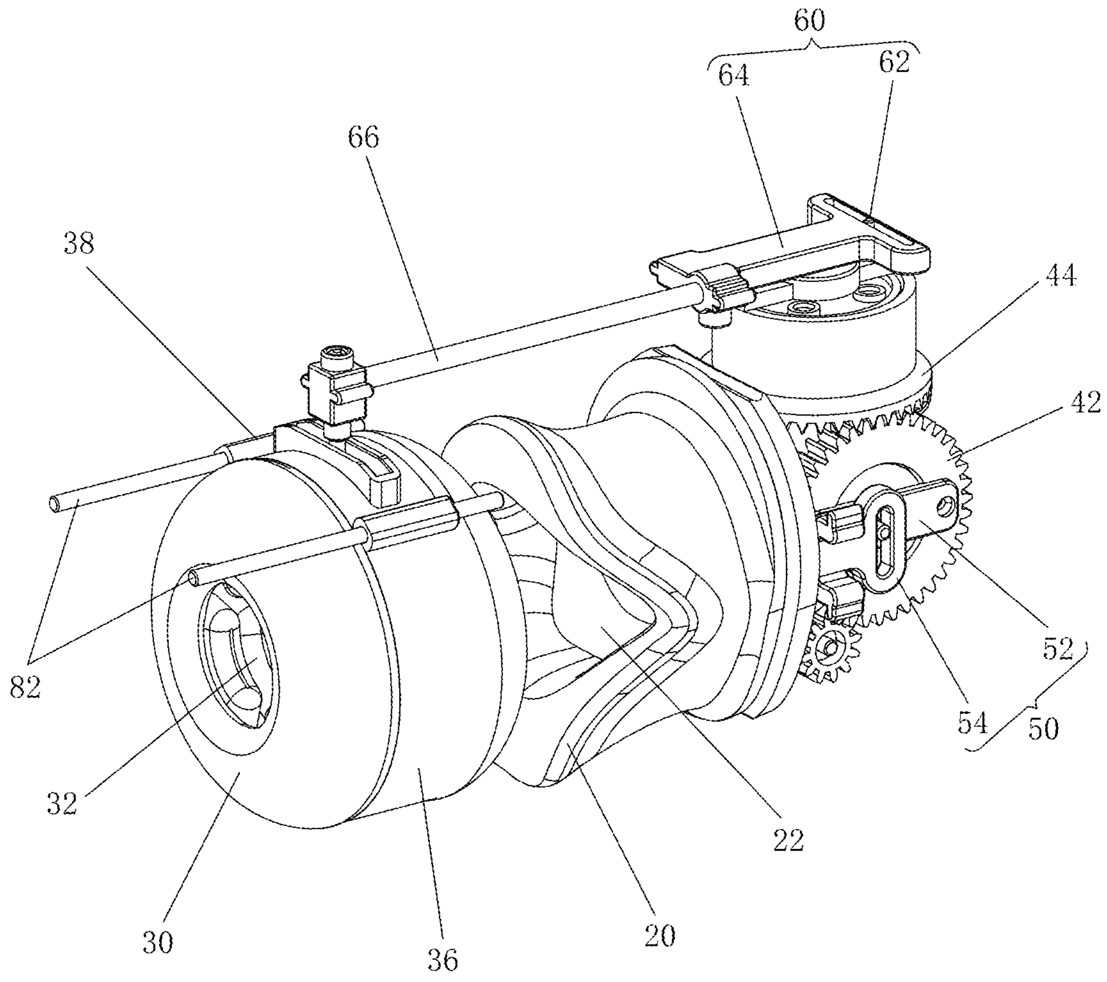
FIG. 6 shows the male sexual stimulation device of FIG. 1 from another aspect, wherein a shell of the device is removed.

As shown in FIG. 6 and FIG. 9, the first transmission unit 50 includes a first transmission member 52 and a first sliding member 54.

Figure 8:
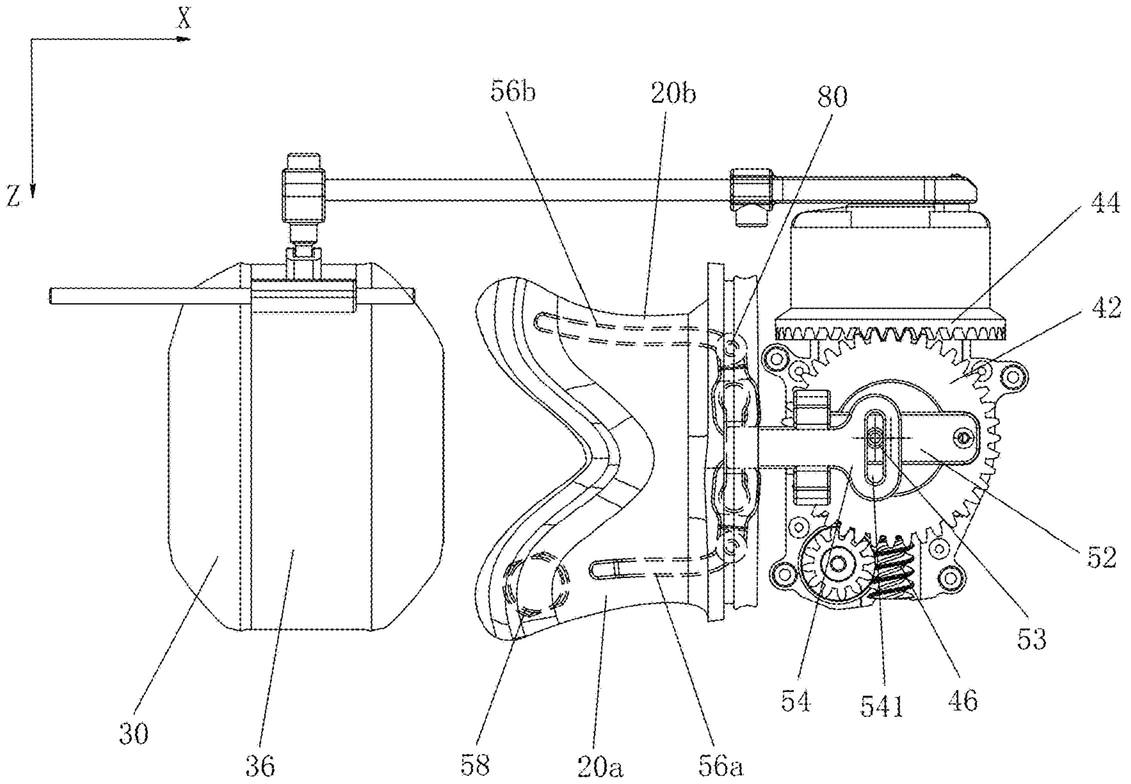
FIG. 8 is a side view of FIG. 6.

The first transmission member 52 is connected to the first output wheel 42, including a first transmission shaft 53 that is eccentrically set relative to a rotary axis of the first output wheel 42. When the first output wheel 42 rotates, the first transmission shaft 53 revolves around the rotary axis of the first output wheel 42. Referring to FIG. 8, the rotary axis of the first output wheel 42 extends along the Y direction, and the first transmission shaft 53 rotates in the XZ plane, generating displacements in both the X direction and the Z direction.

The first sliding member 54 is provided with a first sliding groove 541, and the first transmission shaft 53 is slidably inserted into the first sliding groove 541. The first sliding groove 541 is elongated, with a width in the X direction substantially equivalent to the diameter of the first transmission shaft 53 and a length in the Z direction much greater than the diameter of the first transmission shaft 53. In this way, the movement of the first transmission shaft 53 in the X direction causes the first sliding member 54 to move together in the X direction; while the movement of the first transmission shaft 53 in the Z direction is converted into the sliding of the first transmission shaft 53 along the first sliding groove 541 relative to the first sliding member 54.

Figure 4:
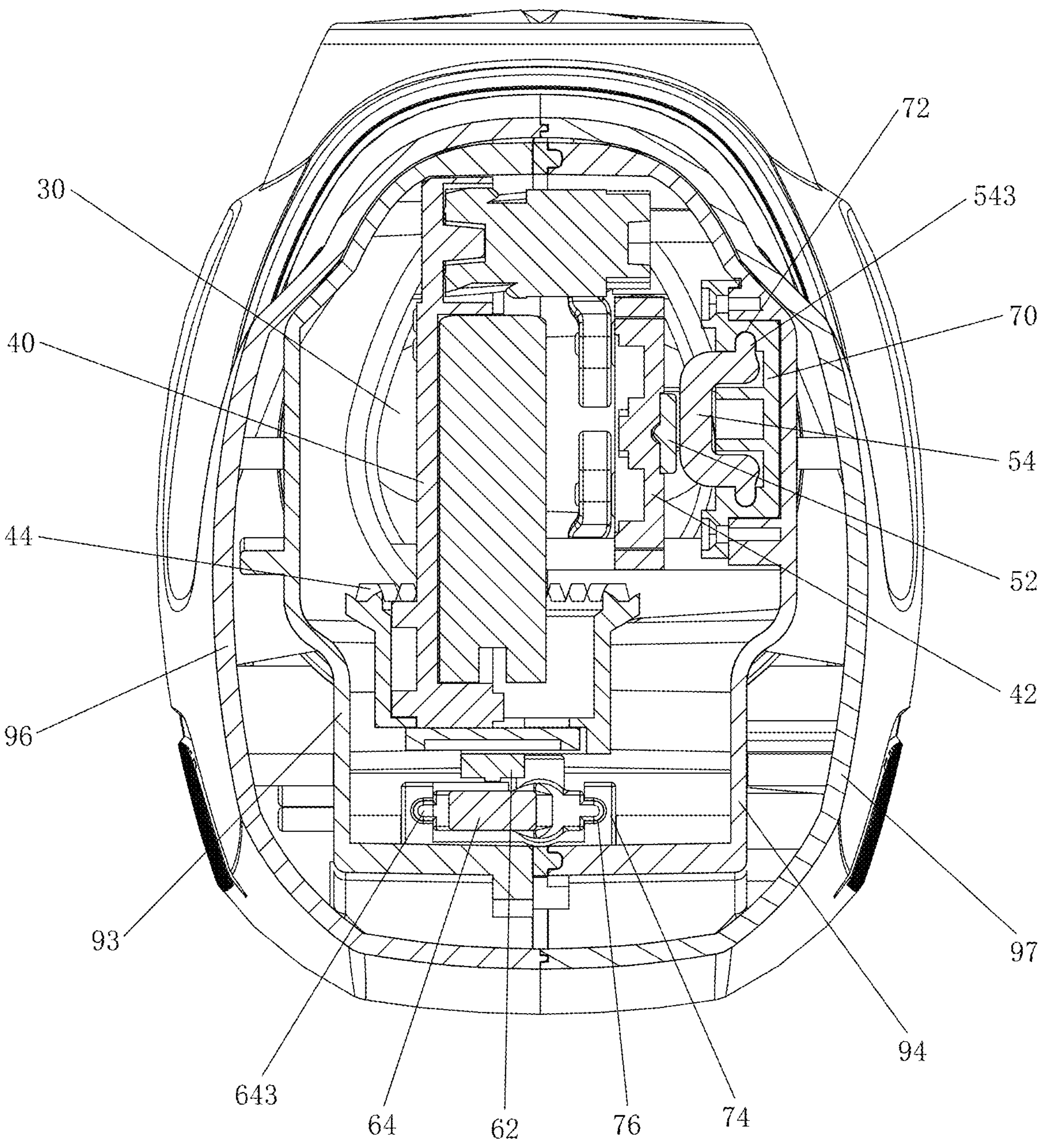
FIG. 4 is a cross sectional view of the male sexual stimulation device taken along line IV-IV of FIG. 2.

By means of cooperation of the first transmission shaft 53 and the first sliding groove 541, the rotation of the first transmission member 52 in the XZ plane is converted into a linear reciprocating movement of the first sliding member 54 in the X direction. Preferably, as shown in FIG. 4 and FIG. 9, the first sliding member 54 protrudes outwardly to form a first guide block 543, and a first guide member 70 with an elongated first guide groove 72 is provided and fixed inside the device 100. After assembly, the first guide block 543 of the first sliding member 54 is slidably engaged into the first guide groove 72 of the first guide member 70, guiding the movement of the first sliding member 54 in the X direction.

The first swinging arm 56*a* and the second swinging arm 56*b* are generally the same in construction and arranged opposite to each other. Each of the first and second swinging arms 56*a*, 56*b* includes a connecting section 561 and a swinging section 563. The connecting sections 561 of the two swinging arms 56*a*, 56*b* are movably connected to the first sliding member 54, and the swinging sections 563 of the two swinging arms 56*a*, 56*b* extend into the first stimulation portion 20*a* and the second stimulation portion 20*b* of the first stimulation member 20, respectively.

Preferably, the first swinging arm 56*a* and the second swinging arm 56*b* are made of hard materials, such as plastic, metal and etc., which can better transmit the force to the first stimulation portion 20 and the second stimulation portion 20*b*. Preferably, during the process of forming the first stimulation member 20, the swinging section 563 of the first swinging arm 56*a* is fixed integrally into the first stimulation portion 20*a*, and the swinging section 563 of the second swinging arm 56*b* is fixed integrally into the second stimulation portion 20*b*.

In this embodiment, the connecting section 561 and swinging section 563 of each of the two swinging arms 56*a*, 56*b* are angled with each other, and a pivot 80 is provided at a connection of the connecting section 561 and swinging section 563 of each of the two swinging arms 56*a*, 56*b*. The two pivots 80 are arranged in parallel intervals, and extend along the Y direction that is perpendicular to the telescopic movement direction (i.e., the X direction) of the first sliding member 54. By means of the pivots 80, the two swinging arms 56*a*, 56*b* can be rotatably set into the device 100. In some embodiments, the pivots 80 are fixed in the device 100, and each swinging arm 56*a*, 56*b* is rotatably mounted around a corresponding pivot 80. In some embodiments, each swinging arm 56*a*, 56*b* may be fixedly connected to the corresponding pivot 80, and the pivots 80 are rotatably set in the device 100.

When the first sliding member 54 moves in the X direction, the connecting sections 561 of the two swinging arms 56*a*, 56*b* move along with the first sliding member 54, causing the two swinging arms 56*a*, 56*b* to rotate around their respective axis rods 80, thereby causing the swinging sections 563 of the two swinging arms 56*a*, 56*b* to swing towards or away from each other, finally driving the first stimulation portion 20*a* and the second stimulation portion 20*b* to swing towards/away from a central portion of the first chamber 22 synchronously. When the first stimulation portion 20*a* and the second stimulation portion 20*b* swing towards each other, the first stimulation member 20 is closed to clamp the male genitalia; and, when the first stimulation portion 20*a* and the second stimulation portion 20*b* swing away from each other, the first stimulation member 20 is opened to release the male genitalia. Compared to existing devices, the first stimulation member 20, which clamps and kneads the male genitalia, especially the glans of the male genitalia, provides more effective stimulation, so that the user is more likely to reach orgasm.

As shown in FIG. 9, the first sliding groove 541 is provided at one end of the first sliding member 54, and the other end of the first sliding member 54 protrudes outwardly to form a connecting portion 545. The connecting section 561 of each swinging arm 56*a*, 56*b* defines a connecting hole 565 therein, and the connecting portion 545 is movably inserted into the connecting holes 565 of the swinging arms 56*a*, 56*b*. When the first sliding member 54 moves in the X direction, the connecting portion 545 can move and rotate in the connecting holes 565 of the swinging arms 56*a*, 56*b*, thereby allowing the swinging arms 56*a*, 56*b* to rotate about the corresponding pivot 80. In this embodiment, the first sliding member 54 is provided with two connecting portions 545, each of which is inserted into the connecting hole 565 of one of the two swinging arms 56*a*, 56*b*.

In some embodiments, one of the first swinging arm 56*a* and the second swinging arm 56*b* may be fixed, for example, the first swinging arm 56*a* may be fixed inside the device 100, and the second swinging arm 56*b* may be rotatably mounted inside the device 100 through the pivot 80. In this situation, the first sliding member 54 is connected to the connecting section 561 of the second swinging arm 56*b*, allowing the second swinging arm 56*b* to rotate about the pivot 80, thereby enabling the swinging section 563 of the second swinging arm 56*b* to swing relative to the first swinging arm 56*a*. In this way, the first stimulation portion 20*a* of the first stimulation member 20 remains stationary, and the second stimulation portion 20*b* swings back and forth relative to the first stimulation portion 20*a* under the driving of the second swinging arm 56*b*, which may also produce a clamping and kneading stimulation effect to the male genitalia that extends into the first chamber 22.

In some embodiments, a vibration motor 58 may be provided in the first stimulation portion 20*a* and/or second stimulation portion 20*b* of the first stimulation member 20 (referring to FIG. 3), so that the first stimulation member 20 can further stimulate the male genitalia through vibration, further improving the stimulation effect.

As shown in FIG. 6 and FIG. 9, the second transmission unit 60 includes a second transmission member 62 and a second sliding member 64.

Figure 7:
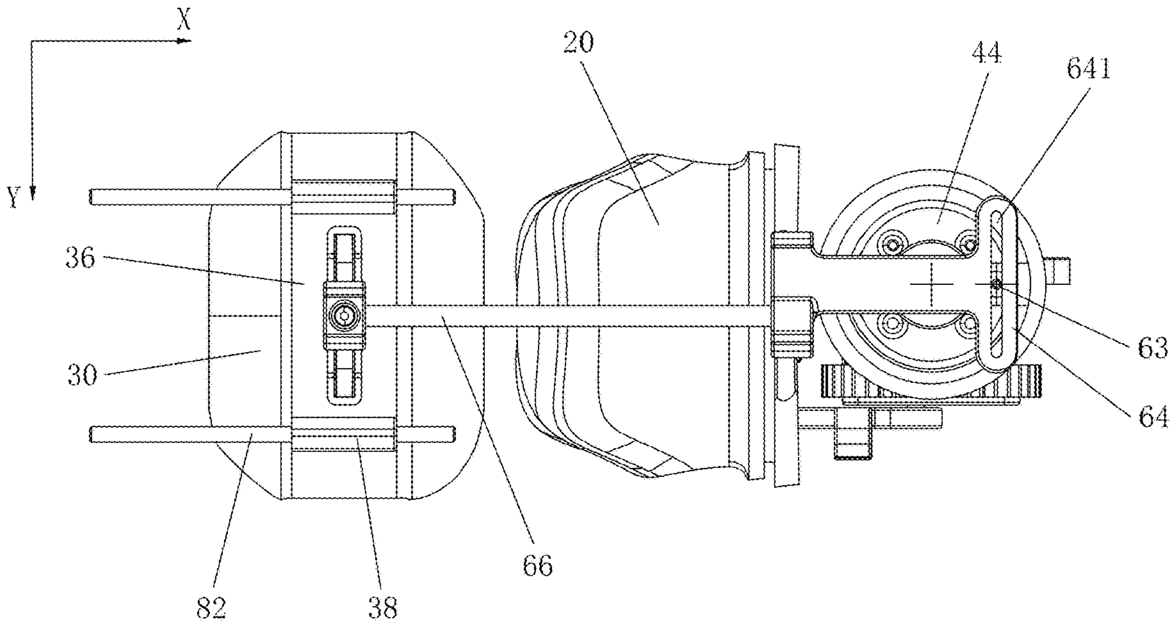
FIG. 7 is a top view of FIG. 6.

The second transmission member 62 is connected to the second output wheel 44, and includes a second transmission shaft 63 that is set eccentrically relative to a rotary axis of the second output wheel 44. When the second output wheel 44 rotates, the second transmission shaft 63 revolves around the rotary axis of the second output wheel 44. Referring to FIG. 7, the rotary axis of the second output wheel 44 extends along the Z direction, and the second transmission shaft 63 rotates in the XY plane, generating displacements in both the X direction and the Y direction.

The second sliding member 64 is provided with a second sliding groove 641, and the second transmission shaft 63 is movably inserted into the second sliding groove 641. The second sliding groove 641 is elongated, with a width in the X direction substantially equivalent to the diameter of the second transmission shaft 63 and a length in the Y direction much greater than the diameter of the second transmission shaft 63. In this way, the movement of the second transmission shaft 63 in the X direction causes the second sliding member 64 to move together in the X direction; and, the movement of the second transmission shaft 63 in the Y direction is converted into the sliding of the second transmission shaft 63 along the second sliding groove 641 relative to the second sliding member 64.

By means of cooperation of the second transmission shaft 63 and the second sliding groove 641, the rotation of the second transmission member 62 in the XY plane is converted into linear reciprocating motion of the second sliding member 64 in the X direction. Preferably, as shown in FIG. 5 and FIG. 9, the second sliding member 64 protrudes outwardly to form a second guide block 643, and the device 100 is fixedly provided with a second guide member 74, and a second guide member 74 with an elongated second guide groove 76 is fixed inside the device 100. The second guide block 643 of the second sliding member 64 is engaged into the second guide groove 76 of the second guiding member 74, guiding the movement of the second sliding member 64 in the X direction.

In the illustrated embodiment, the second transmission unit 60 is set at an end of the first stimulation member 20 away from the second stimulation member 30. There is a large distance between the second sliding member 64 and the second stimulation member 30, and a connecting rod 66 is provided therebetween to achieve long-distance power transmission, so that the second sliding member 64 can drive the second stimulation member 30 to move back and forth in the X direction, stimulating a portion of the male genitalia, such as a rear end of the male genitalia, in the second chamber 32. It should be understood that, according to the position of the second sliding member 64 and the second stimulation member 30 inside the device 100, the connecting rod 66 may be single or multiple. In some embodiments, when the positions of the second sliding member 64 and the second stimulating member 30 are close to each other, the connecting rod 66 may be omitted.

As shown in FIG. 3 and FIG. 9, a plurality of protrusions 34 extends inwardly from an inner circumferential surface of the second stimulation member 30 towards the second chamber 32. The protrusions 34 may be convex points, convex pillars, convex strips, convex ribs, etc., which compresses the male genitalia in the second chamber 32, further enhancing the stimulation effect of the second stimulation member 30.

As shown in FIG. 3 and FIG. 9, an outer circumferential surface of the second stimulation member 30 is concaved to form an annular groove, in which a fixing ring 36 is accommodated. The fixing ring 36 may be made of hard material and used for connecting the second stimulation member 30 to the second transmission unit 60. Preferably, the fixing ring 36 is integrally fixed onto the second stimulation member 30 during the injection molding process of the second stimulation member 30.

As shown in FIG. 6 and FIG. 9, an outer wall of the fixing ring 36 protrudes to form a guide portion 38, in which a guide rod 82 is movably inserted. The guide rod 82 is fixed in the device 100 and extends along the X direction, so as to guide the movement of the second stimulation member 30 in the X direction. The guide portion 38 and the guide rod 82 are preferably multiple, so that the force on the second stimulation member 30 is more balanced, and thus the movement of the second stimulation member 30is more stable.

Specifically, the first guide member 70, the second guide member 74, the pivots 80, the guide rods 82, and the like may be fixed in a shell 90 of the device 100. As shown in FIG. 5, the shell 90 includes an inner shell and an outer shell that encloses the inner shell, wherein the inner shell includes a first inner shell 92, a second inner shell 93, and a third inner shell 94, and the outer shell includes a first shell 96 and a second shell 97.

The first inner shell 92 is generally cylindrical-shaped, with a first space therein for mounting the first and second stimulation members 20, 30. The second inner shell 93 and the second inner shell 93 are connected to each other by, for example, snap-fitting, and a second space is formed therebetween for mounting the transmission unit. Preferably, as shown in FIG. 3, a structure formed by the second inner shell 93 and the second inner shell 93 has an open end at a side thereof facing the first stimulation member 20, and a close end of the first stimulation member 20 covers and seals the open end.

The first shell 96 and the second shell 97, which may be connected through snap-fitting, cooperatively form the outer shell of the device 100. Preferably, the outer shell and the first inner shell 92 are spaced from each other in the radial direction, thereby forming a space therebetween for extending of the connecting rod 66 therethrough to connecti the second stimulation member 30 to the second transmission unit 60. In the illustrated embodiment, an end of the connecting rod 66 is provided with a pin 68, and the first inner shell 92 forms a slot which is elongated in the X direction. During assembly, the pin 68 extends through the slot into the first inner shell 92 to connect the fixing ring 36.

As shown in FIG. 3 and FIG. 5, the shell 90 is further equipped with a battery 84, a circuit board, and etc. The battery 84 is electrically connected to electronic components inside the device 100, such as the driving motor 40, the vibration motor 58, etc., through the circuit board. Control buttons 99 are provided on the shell 90, through which the operation of the device 100, such as the rotary speed and direction of the driving motor 40, the vibration frequency of the vibration motor 58, and etc., can be controlled, so that the first and second stimulation members 20, 30 can provide different degrees of stimulation according to user needs.

In this embodiment, the first output wheel 42 and the second output wheel 44 are both gears and mesh with each other. The rotary axis of the first output wheel 42 is perpendicular to the rotary axis of the second output wheel 44, so that the first transmission component 50 and the second transmission unit 60 can be arranged at different sides of the device 100, fully utilizing the internal space of the device 100 and making the product size controllable. In addition, meshing of the first output wheel 42 and the second output wheel 44 allows the first and second stimulation members 20, 30 both to be driven by the same motor 40, further simplifying the structure and saving costs.

In the illustrated embodiment, a transmission component 46, such as a worm gear, is provided between the driving motor 40 and the first output wheel 42, the second output wheel 44, which can not only transmit the torque from the driving motor 40 to the first output wheel 42 and the second output wheel 44, but also change the direction of torque transmission as needed. In some embodiments, other transmission units, such as bevel gears, planetary gears, pulleys, etc., or a combination of multiple transmission units, may be provided between the driving motor 42 and the first and second output wheels 42, 44.

In addition, in some embodiments, the driving assembly may include multiple driving motors, wherein the first output wheel 42 and the second output wheel 44 are separated from each other and connected to different driving motors, so that the movement of the first and second stimulation members 20, 30 can be controlled separately.

Referring to FIGS. 10-14, a male sexual stimulation device according to another embodiment of the present application is shown. In this embodiment, the male sexual stimulation device 100 includes a first stimulation member 20, a second stimulation member 30, and a driving assembly. A first chamber 22 is defined in the first stimulation member 20, and a second chamber 32 is defined in the second stimulation member 30. The first chamber 22 and the second chamber 32 are arranged in sequence and communicated to each other, cooperatively forming an accommodating chamber to accommodate a male genitalia.

Differently, the driving assembly of this embodiment includes a first motor 47 and a second motor 48, wherein the first motor 47 is used to drive the first stimulation member 20, and the second motor 48 is used to drive the second stimulation member 30.

Figure 14:
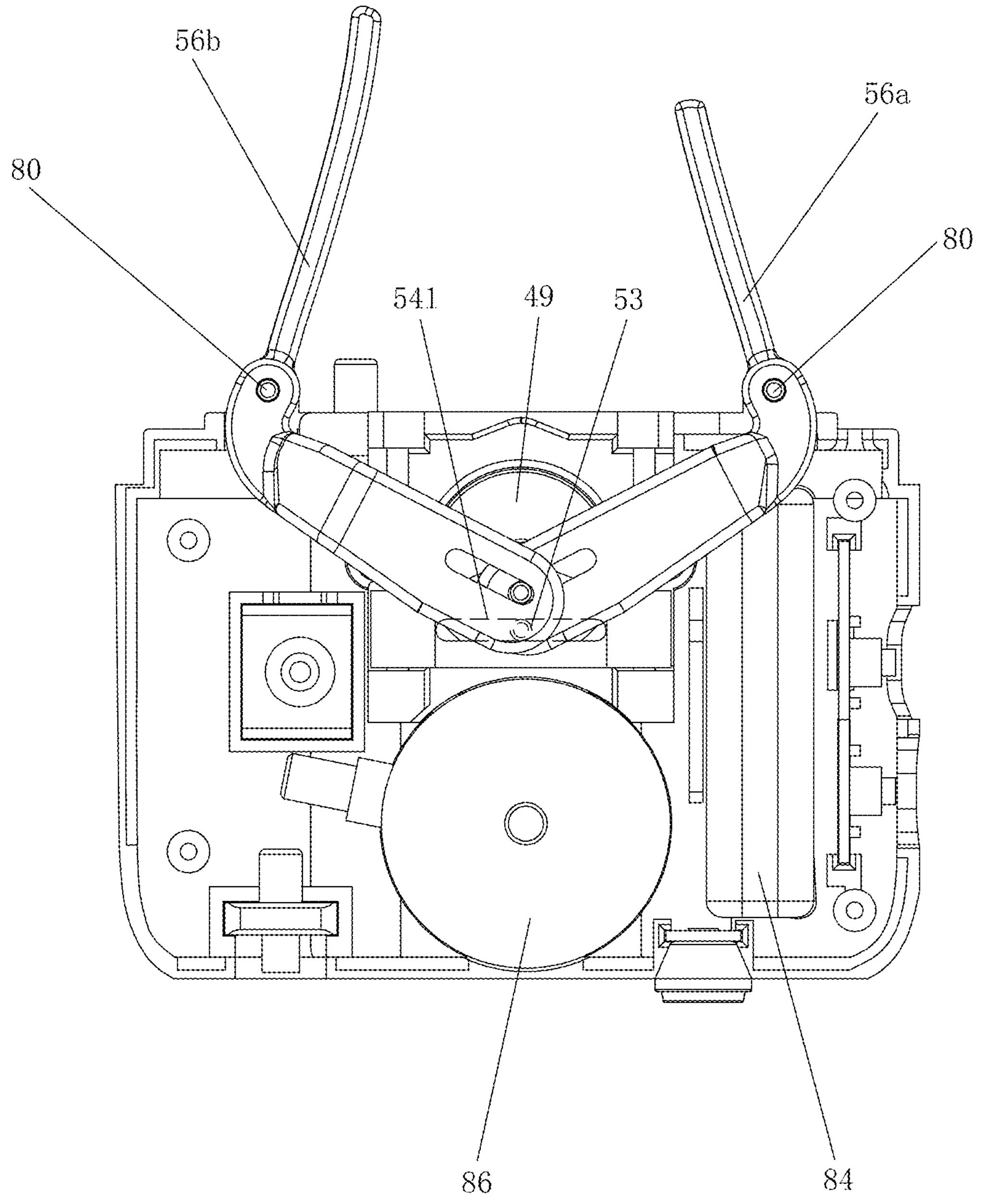
FIG. 14 is a side view of the driving assembly of FIG. 13.

In this embodiment, the first motor 47 is a rotary motor that drives an output wheel 49 to rotate at an appropriate speed. The output wheel 49 is connected to the first and second swinging arms 56*a*, 56*b* through a transmission unit 50. As shown in FIG. 14 and FIG. 15, the transmission unit 50 includes a first transmission member 52 and a first sliding member 54. The first transmission member 52 includes a first transmission shaft 53 eccentrically arranged relative to a rotary axis of the output wheel 49, and a first sliding groove 541 is defined in the first sliding member 54. The first transmission shaft 53 is movably inserted into the first sliding groove 541.

The first swinging arm 56*a* and the second swinging arm 56*b* each are rotatably mounted in the device 100 through a pivot 80, with one end thereof movably connected to the first sliding member 54 and the other end thereof extending into the first stimulation portion 20*a* or the second stimulation portion 20*b* of the first stimulation member 20.

Under the action of the first motor 47, the first transmission shaft 53 rotates in the XZ plane, and through its cooperation with the first sliding groove 541, drives the first sliding member 54 to move back and forth in the X direction, which in turn drives the first swinging arm 56*a* and the second swinging arm 56*b* connected to it to swing relative to each other, finally causing the first stimulation portion 20*a* and the second stimulation portion 20*b* to clamp and knead the glans of the male genitalia accommodated in the first chamber 22.

In this embodiment, the second motor 48 is a vibration motor embedded in the second stimulation member 30, causing the second stimulation member 30 to vibrate at high frequency, thereby stimulating the male genitalia accommodated in the second chamber 32.

In this embodiment, the first and second stimulation members 20, 30, under the action of the driving assembly, stimulate the male genitalia in different manners, wherein the first stimulation member 20 has a clamping and kneading effect on the male genitalia, and the second stimulation member 30 has a vibrating stimulating effect on the male genitalia. The two different effects enable the male genitalia to be fully stimulated, resulting in better user experience.

It should be understood that the second stimulation member 30 may be driven to move back and forth in the axial direction while vibrates under the driving of the second motor 48, thereby further enhancing its stimulation effect. For example, a transmission unit may be provided to connect the second stimulation member 30 to the first motor 47; or, an additional motor can be provided to drive the second stimulation member 30 to move back and forth.

It should be understood that the second stimulation member 30 may be driven to rotate while vibrates under the driving of the second motor 48, thereby further enhancing its stimulation effect. The rotation of the second stimulation member 30 may be driven by the first motor 47 or by an additional motor. In addition, the linear movement, rotation of the second stimulation member may be performed independently, that is, without starting the vibration motor 48 or without setting the vibration motor 48.

Figure 13:
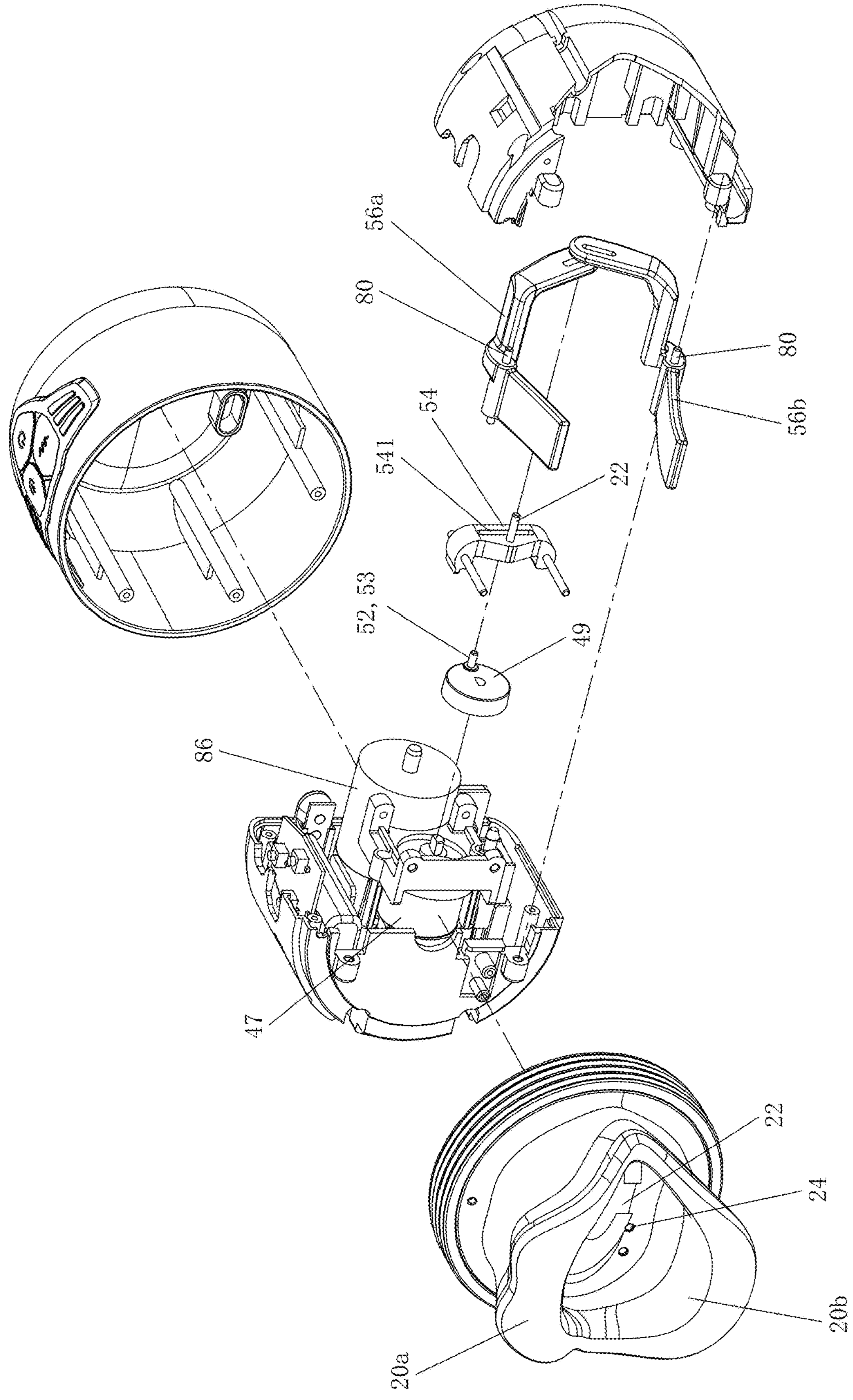
FIG. 13 is a further exploded view of a first stimulation member and a driving assembly of the male sexual stimulation device of FIG. 10.

In this embodiment, as shown in FIG. 13 and FIG. 14, the device 100 further includes an air pump 86, which is connected to the first chamber 22 of the first stimulation member 20 through a pipeline, so as to suck air from the first chamber 22 to generate a negative pressure effect, further stimulating the male genitalia, especially the glans, in the first chamber 22. As shown in FIG. 13, the bottom of the first stimulation member 20 is provided with a hole 24, which is connected to the pipeline of the air pump 86, so that the air in the first chamber 22 can be discharged. To simplify the drawings, the pipeline between the air pump 86 and the hole 24 is not shown.

During use, the male genitalia may be stimulated only by the swinging of the first and/or second stimulation portions of the first stimulating member, and may be further stimulated by the linear movement, rotation, vibration, etc. of the second stimulating member, and/or may be further stimulated by the suction of the air pump, getting better stimulation effect and better user experience.

The above are merely preferred embodiments of the present application, which are not intended to limit the present application. Any modifications, equivalent substitutions, and improvements made without departing from the spirit and principles of this application should fall within the scope of the present application.

What is claimed is:

1. A male sexual stimulation device, comprising:

a first stimulation member comprising a first stimulation portion and a second stimulation portion which are opposite to each other in a first direction, a first chamber being defined between the first and second stimulation portions;

a second stimulation member defining a second chamber therein, the first and second chambers communicating with each other and cooperatively forming an accommodating space for receiving a male genitalia therein; and a driving assembly comprising a first swinging arm and a driving source configured for driving the first swinging arm to swing towards or away from a central axis of the accommodating space, one end of the first swinging arm extending into the first stimulation portion, making the first stimulation portion be swingable relative to the second stimulation portion in the first direction to stimulate the male genitalia received in the accommodating space.

2. The male sexual stimulation device according to claim 1, wherein the driving assembly further comprises a second swinging arm which is swingable towards or away from the central axis of the accommodating space under the driving of the driving source, one end of the second swinging arm extending into the second stimulation portion, making the first and second stimulation portions being swingable towards each other or away from each other in the first direction to stimulate the male genitalia received in the accommodating space.

3. The male sexual stimulation device according to claim 1, wherein the first stimulation member is configured as a mouth, and the second stimulation member is substantially cylindrical-shaped, the male genitalia extending through the second chamber of the second stimulation member into the first chamber of the first stimulation member.

4. The male sexual stimulation device according to claim 3, wherein a plurality of protrusions is formed on an inner circumferential surface of the second stimulation member.

5. The male sexual stimulation device according to claim 3, wherein an end of the first stimulation member away from the second stimulation member is closed.

6. The male sexual stimulation device according to claim 1, wherein the first and second stimulation members are arranged in sequence and separated from each other in an axial direction of the device.

7. The male sexual stimulation device according to claim 1, further comprising a vibration motor embedded in the first stimulation member.

8. The male sexual stimulation device according to claim 1, further comprising a vibration motor embedded in the second stimulation member.

9. The male sexual stimulation device according to claim 1, further comprising an air pump connected to the first stimulation member to suck air from the first chamber.

10. The male sexual stimulation device according to claim 1, wherein the second stimulation member is rotatable relative to the first stimulation member.

11. The male sexual stimulation device according to claim 1, wherein the second stimulation member is movable relative to the first stimulation member in an axial direction of the accommodating space.

12. The male sexual stimulation device according to claim 11, wherein the driving source comprises a driving motor, and a second transmission unit connected between the driving motor and the second stimulation member, the second transmission unit is configured for converting rotation into linear movement of a second sliding member in the axial direction of the accommodating space, and the second stimulation member is fixedly connected to the second transmission unit in the axial direction of the accommodating space, so as to move relative to the first stimulation member in the axial direction during use.

13. The male sexual stimulation device according to claim 1, wherein the driving source comprises a driving motor, and a first transmission unit connected between the driving motor and the first stimulation member, the first transmission unit is configured for converting rotation of the driving motor into linear movement of a first sliding member in an axial direction of the accommodating space, and the first swinging arm is connected to the first sliding member.

14. The male sexual stimulation device according to claim 13, wherein the first transmission unit comprises a first output wheel connected to the driving motor, and a first transmission shaft eccentrically set relative to a rotary axis of the first output wheel, an elongated first sliding groove is defined in the first sliding member, the first transmission shaft is movably inserted into the first sliding groove, and the first swinging arm is movably connected to the first sliding member.

15. The male sexual stimulation device according to claim 12, wherein the second transmission unit comprises a second output wheel connected to the driving motor in a transmission way, and a second transmission shaft eccentrically set relative to a rotary axis of the second output wheel, an elongated second sliding groove is defined in the second sliding member, the second transmission shaft is movably inserted into the second sliding groove.

16. The male sexual stimulation device according to claim 1, wherein the driving source comprises a driving motor, and first and second output wheels connected to the driving motor, the first and second output wheels mesh with each other, a rotary axis of the first output wheel is perpendicular to a rotary axis of the second output wheel, the first stimulation member is connected to the first output wheel by a first transmission unit, the second stimulation member is connected to the second output wheel by a second transmission unit, and the first and second transmission units are arranged at different sides of the device, respectively.

17. A male sexual stimulation device, comprising:
- a hollow shell;
- first and second stimulation members mounted in the shell and set in sequence along an axial direction of the shell;
- a first chamber being defined in the first stimulation member, a second chamber being defined in the second stimulation member, the first and second chambers communicating with each other and cooperatively forming an accommodating chamber for receiving a male genitalia therein; and
- a driving assembly mounted in the shell to drive the first and second stimulation members to move in different manners, so as to stimulate the male genitalia received in the accommodating space in different manners;
- wherein the driving assembly comprises a driving motor, a first transmission unit connected between the driving motor and the first stimulation member, and a second transmission unit connected between the driving motor and the second stimulation member; and
- wherein the first transmission unit is configured for converting rotation of the driving motor into linear movement of a first sliding member in an axial direction of the accommodating space, and the first stimulation member is connected to the first sliding member and driven to swing towards or away from a central axis of the accommodating space.

18. The male sexual stimulation device according to claim 17, wherein the first stimulation member comprises a first stimulation portion and a second stimulation portion which are opposite to each other in a first direction, under the action of the driving assembly, the first stimulation member and the second stimulation portion are driven to swing towards or away from each other in the first direction, swing axes of the first stimulation member and the second stimulation portion are parallel to and spaced from each other, and the second stimulation member is driven to do rotation, vibration or linear movement.

19. The male sexual stimulation device according to claim 17, further comprising an air pump connected to the first stimulation member to suck air from the first chamber.

20. The male sexual stimulation device according to claim 17, wherein the first stimulation member is configured as a mouth, and the second stimulation member is substantially cylindrical-shaped, the male genitalia extending through the second chamber of the second stimulation member with its glans being enclosed by the first stimulation member.

* * * * *